(12) United States Patent
Rauma et al.

(10) Patent No.: US 9,365,117 B2
(45) Date of Patent: Jun. 14, 2016

(54) MOBILE WORKING MACHINE

(71) Applicant: Visedo Oy, Lappeenranta (FI)

(72) Inventors: Kimmo Rauma, Lappeenranta (FI);
Antti Tarkiainen, Lappeenranta (FI)

(73) Assignee: VISEDO OY, Lappeenranta (FI)

( * ) Notice: Subject to any disclaimer, the term of this patent is extended or adjusted under 35 U.S.C. 154(b) by 132 days.

(21) Appl. No.: 14/147,953

(22) Filed: Jan. 6, 2014

(65) Prior Publication Data

US 2014/0195085 A1 Jul. 10, 2014

(30) Foreign Application Priority Data

Jan. 4, 2013 (EP) .................................... 13150270

(51) Int. Cl.
*B60L 9/00* (2006.01)
*B60L 3/00* (2006.01)
*B60L 11/12* (2006.01)
(Continued)

(52) U.S. Cl.
CPC . *B60L 3/00* (2013.01); *B60L 11/12* (2013.01); *B60L 11/14* (2013.01); *B60W 20/106* (2013.01); *B60W 20/13* (2016.01); *B60L 2200/40* (2013.01); *B60L 2240/423* (2013.01); *B60L 2240/441* (2013.01); *B60L 2240/443* (2013.01); *B60L 2240/547* (2013.01); *Y02T 10/642* (2013.01); *Y02T 10/7005* (2013.01); *Y02T 10/7077* (2013.01); *Y10S 903/93* (2013.01)

(58) Field of Classification Search
CPC ..... B60W 20/00; B60W 10/08; B60W 10/06; B60W 20/106; E02F 9/2075; Y02T 10/7077; B60L 3/00

USPC .......................... 701/22; 180/65.265; 903/930
See application file for complete search history.

(56) References Cited

U.S. PATENT DOCUMENTS

2009/0251083 A1* 10/2009 Kinpara ................... H02P 5/74
318/400.11
2010/0079104 A1*  4/2010 Becker ................... H02P 23/30
318/802

(Continued)

FOREIGN PATENT DOCUMENTS

DE       200 01 113 U1      3/2000
DE       198 58 348 A1      6/2000

(Continued)

OTHER PUBLICATIONS

European Search Report, dated Jul. 4, 2013, from corresponding European application.

*Primary Examiner* — Shardul Patel
(74) *Attorney, Agent, or Firm* — Young & Thompson

(57) ABSTRACT

A mobile working machine includes an energy source, a storage circuit for storing electrical energy, a first electronic power converter stage between the storage circuit and the energy source, an electrical machine for driving actuators, a second electronic power converter stage between the storage circuit and the electrical machine, and a control system for controlling the first electronic power converter stage responsive to the power taken by the second electronic power converter stage from the storage circuit, the control system providing a control signal path from the storage circuit to the first electronic power converter stage. The signal processing properties of the control signal path are dependent on the electrical energy stored by the storage circuit in order to allow the electrical energy to vary, but within desired limits, so as to reduce the peak power taken from the energy source.

13 Claims, 4 Drawing Sheets

(51) Int. Cl.
*B60L 11/14* (2006.01)
*B60W 20/00* (2016.01)

(56) References Cited

U.S. PATENT DOCUMENTS

| | | | | |
|---|---|---|---|---|
| 2010/0094494 | A1* | 4/2010 | Jerwick | B60K 6/48 701/22 |
| 2010/0097037 | A1* | 4/2010 | Morinaga | B60K 6/46 322/14 |
| 2010/0164428 | A1* | 7/2010 | Xu | F01D 15/10 318/767 |
| 2012/0059537 | A1* | 3/2012 | Hendrickson | H02M 7/44 701/22 |
| 2013/0096764 | A1* | 4/2013 | Yamamoto | B60K 6/445 701/22 |
| 2013/0110260 | A1* | 5/2013 | Carpinteri | H02J 13/0075 700/20 |
| 2013/0298544 | A1* | 11/2013 | Izumi | E02F 9/123 60/413 |
| 2013/0299256 | A1* | 11/2013 | Yamashita | E02F 9/2095 180/68.1 |
| 2014/0163804 | A1* | 6/2014 | Kaneko | B60K 6/46 701/22 |

FOREIGN PATENT DOCUMENTS

| | | |
|---|---|---|
| DE | 10 2004 057100 A1 | 6/2006 |
| DE | 10 2010 042915 A1 | 4/2012 |

\* cited by examiner

MOBILE WORKING MACHINE

FIELD OF THE INVENTION

The invention relates to a method for reducing peak power taken out from an energy source of a mobile working machine. Furthermore, the invention relates to a mobile working machine and to a computer program for reducing peak power taken out from an energy source of a mobile working machine.

BACKGROUND

An electromechanical power transmission chain of a mobile working machine comprises typically one or more electrical machines and one or more electronic power converters. The electromechanical power transmission chain can be a series transmission chain where one of the electrical machines operates as a generator and the one or more electronic power converters are arranged to convert the electrical voltages produced by the generator into electrical voltages having amplitudes and frequencies suitable for the one or more other electrical machines. The generator can be driven with a combustion engine that can be e.g. a diesel engine, an Otto-cycle engine, or a turbine engine. The other electrical machines can be, for example, electrical motors arranged to drive wheels, chain tracks, or other actuators of the mobile working machine. It is also possible that the electromechanical power transmission chain is a parallel transmission chain where an electrical machine that is mechanically connected to a combustion engine operates sometimes as a generator which charges one or more energy-storages and sometimes as a motor that receives electrical energy from the one or more energy-storages and assists the combustion engine when high mechanical output power is needed. It is also possible that the electromechanical power transmission chain is between a battery element and one or more actuators of the mobile working machine. In this case, the electromechanical power transmission chain may comprise an electrical motor for driving the one or more actuators and an electronic power converter between the battery element and the electrical motor. The mobile working machine can be, for example, a tractor, a bucket charger, a road drag, an excavator, or a bulldozer.

The electromechanical power transmission chain provides advantages compared to a traditional mechanical power transmission chain because, for example, the rotational speed of the combustion engine can be more freely selected from the viewpoint of the operational efficiency of the combustion engine, and thus savings in the fuel costs can be achieved. However, there is still a need to reduce operating costs of working machines of the kind mentioned above.

The publication US2010097037 describes a method for controlling an electromechanical power transmission chain of a mobile working machine so that capacitance of a capacitive energy storage circuit can be minimized and also the peak power taken from a combustion engine of the mobile working machine can be reduced. This control method is, however, based on an assumption that the temporal variation of the load is predictable. This assumption, however, is not valid in a general case.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention there is provided a new mobile working ma-chine that can be, for example but not necessarily, a tractor, a bucket charger, a road drag, an excavator, or a bulldozer. A mobile working machine according to the invention comprises:

an energy source for supplying electrical energy,
a storage circuit for storing electrical energy,
a first electronic power converter stage connected between the energy source and the storage circuit,
an electrical machine for driving one or more wheels, chain tracks, a hydraulic pump, or one or more other actuators of the mobile working machine,
a second electronic power converter stage connected between the storage circuit and the electrical machine, and
a control system for controlling the first electronic power converter stage to respond to fluctuation of power taken by the second electronic power converter stage from the storage circuit, the control system providing a control signal path from the storage circuit to the first electronic power converter stage, wherein the control system is arranged to change at least one signal processing property of the control signal path on the basis of the electrical energy stored by the storage circuit so that the control of the electrical energy is slower to respond to changes of the power taken by the second electronic power converter stage when the electrical energy has a first value that is between second and third values than when the electrical energy has either one of the second and third values.

As the at least one signal processing property of the control signal path is arranged to be dependent on the electrical energy stored by the storage circuit, the control of the electrical energy can be arranged to be slow when the electrical energy is between desired limits and thus the electrical energy can be allowed to vary so as to at least partially respond to peak power needs of the one or more actuators driven by the electrical machine. On the other hand, the control of the electrical energy can be tuned to be faster when the electrical energy is outside the area between the above-mentioned desired limits and thus the electrical energy can be kept sufficiently well in the area between the desired limits.

The above-mentioned energy source of the mobile working machine can be, for example, a combination of a combustion engine and a generator. It is also possible that the energy source is a battery element. The above-mentioned storage circuit can be a capacitive circuit, where the stored electrical energy is directly proportional to the square of the voltage of the capacitive circuit. It is also possible that the storage circuit is an inductive circuit, where the stored electrical energy is directly proportional to the square of the current of the inductive circuit.

In accordance with the invention there is provided also a new method for reducing the peak power taken out from an energy source of a mobile working machine that comprises:

a storage circuit for storing electrical energy,
a first electronic power converter stage connected between the storage circuit and the energy source of the mobile working machine,
an electrical machine for driving one or more actuators of the mobile working machine, a second electronic power converter stage connected between the storage circuit and the electrical machine, and a control system for controlling the first electronic power converter stage to respond to fluctuation of power taken by the second electronic power converter stage from the storage circuit, the control system providing a control signal path from the storage circuit to the first electronic power converter stage.

A method according to the invention comprises changing at least one signal processing property of the control signal path on the basis of the electrical energy stored by the storage circuit so that a control of the electrical energy is slower to respond to changes of the power taken by the second electronic power converter stage when the electrical energy has a first value that is between second and third values than when the electrical energy has either one of the second and third values.

In accordance with the invention there is provided also a new computer program for reducing the peak power taken out from the energy source of the above-described mobile working machine. A computer program according to the invention comprises computer executable instructions for controlling a programmable processor to change at least one signal processing property of the control signal path on the basis of the electrical energy stored by the storage circuit so that a control of the electrical energy is slower to respond to changes of the power taken by the second electronic power converter stage when the electrical energy has a first value that is between second and third values than when the electrical energy has either one of the second and third values.

A computer program product according to the invention comprises a non-volatile computer readable medium, e.g. a compact disc "CD", encoded with a computer program according to the invention.

A number of non-limiting exemplifying embodiments of the invention are described in accompanied dependent claims.

Various non-limiting exemplifying embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of unrecited features. The features recited in depending claims are mutually freely combinable unless otherwise explicitly stated.

BRIEF DESCRIPTION OF THE FIGURES

The exemplifying embodiments of the invention and their advantages are explained in greater detail below in the sense of examples and with reference to the accompanying drawings, in which.

DESCRIPTION OF THE EXEMPLIFYING EMBODIMENTS

Figure 1:
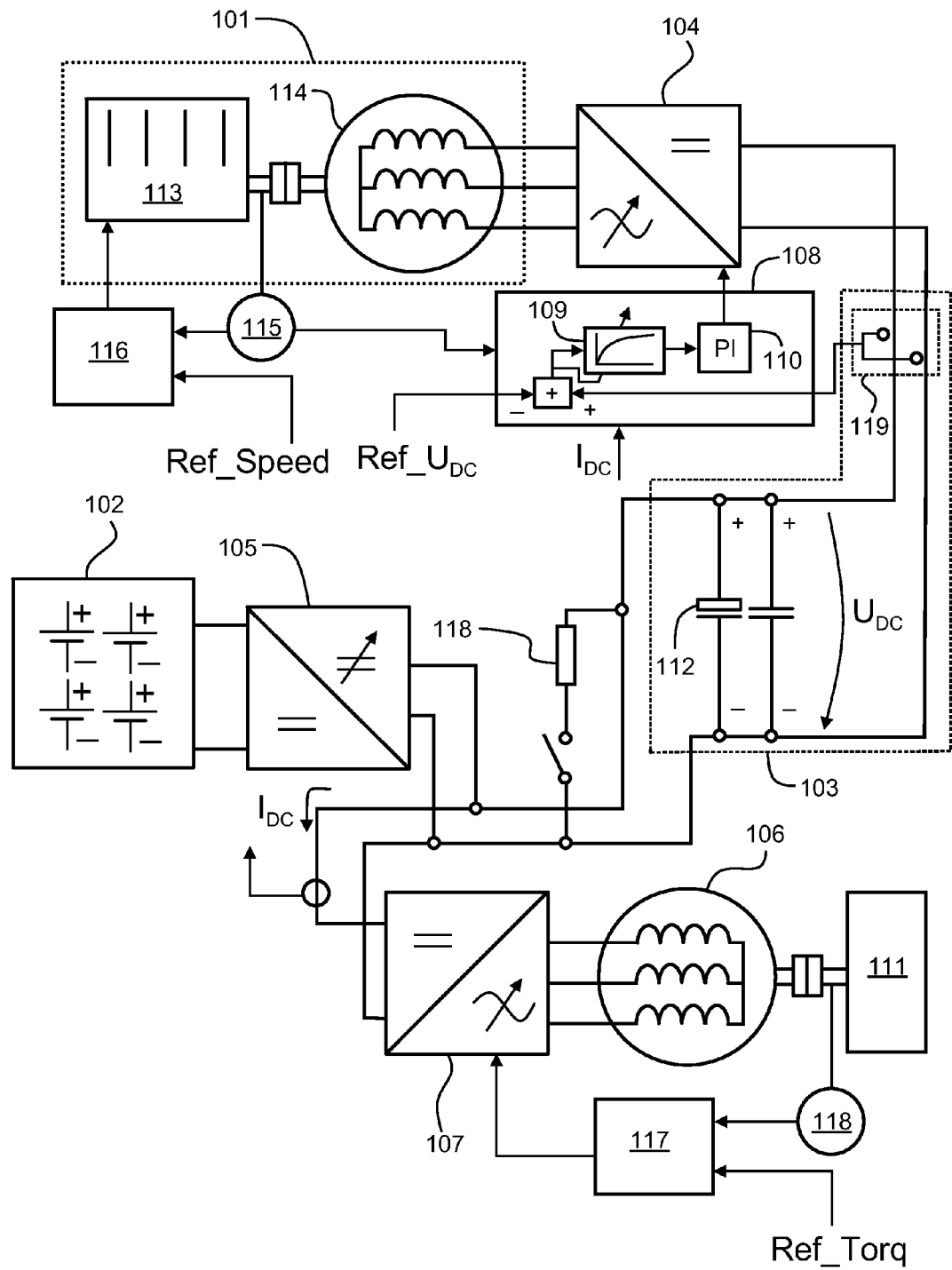
FIG. 1 shows a schematic illustration of a powering system of a mobile working machine according to an exemplifying embodiment of the invention.

FIG. 1 shows a schematic illustration of a powering system of a mobile working machine according to an exemplifying embodiment of the invention. The mobile working machine comprises an energy source 101 for supplying electrical energy. In this exemplifying case, the energy source 101 comprises a combustion engine 113 and a generator 114. The mobile working machine comprises an electrical machine 106 for driving an actuator 111 of the mobile working machine. The actuator can be, for example, a wheel, a chain track, or a hydraulic pump. The mobile working machine comprises a first electronic power converter stage 104 connected to stator windings of the generator 114, a second electronic power converter stage 107 connected to stator windings of the electrical machine 106, and a storage circuit 103 capable of storing electrical energy and connected to the first and second electronic power converter stages 104 and 107. In the exemplifying case illustrated in FIG. 1, the storage circuit 103 is a capacitive storage circuit and the electrical energy E stored by the storage circuit 103 is directly proportional to the square of voltage $U_{DC}$, i.e. $E=\frac{1}{2}CU_{DC}^2$, where C is the capacitance of the storage circuit 103. The storage circuit 103 may comprise an electric double layer capacitor "EDLC" 112 in order to increase the energy storing capacity of the storage circuit. An EDLC is sometimes called a "super capacitor". In some other cases, the storage circuit could be an inductive circuit where the stored electrical energy is $\frac{1}{2}LI^2$, where L is the inductance of the inductive circuit and I is current of the inductive circuit. The mobile working machine comprises a control system 108 for controlling the first electronic power converter stage 104 to respond to fluctuation of power taken by the second electronic power converter stage 107 from the storage circuit 103. The control system 108 provides a control signal path from the storage circuit 103 to the first electronic power converter stage 104. In the exemplifying case illustrated in FIG. 1, the control signal path extends from a sensor 119 for measuring the voltage $U_{DC}$ to a control input of the first electronic power converter stage 104 via the control system 108.

At least one signal processing property of the above-mentioned control signal path is arranged to be dependent on the amount of the electrical energy stored by the storage circuit 103. In the exemplifying case illustrated in FIG. 1, the control signal path comprises a controllable filter 109 and the control system 108 is arranged to increase the bandwidth of the controllable filter in response to a situation in which the electrical energy gets farther from the reference value of the electrical energy, i.e. the voltage $U_{DC}$ gets farther from its reference value $U_{DC}$ Ref. The controllable filter 109 is preferably a controllable low-pass filter "LPF". The control signal path further comprises a proportional and integrative "PI" regulator 110 in series with the controllable low-bass filter 109. As the bandwidth of the controllable filter is increased when the electrical energy stored by the storage circuit 103 gets farther from its reference value, the control of the electrical energy stored by the storage circuit 103 gets faster when the energy gets farther from its reference value and slower when the energy gets nearer to the reference value. Therefore, the control of the voltage $U_{DC}$ can be arranged to be slow when the voltage $U_{DC}$ is between desired limits and thus the voltage $U_{DC}$ can be allowed to vary so as to at least partially respond to peak power needs of the actuator 111 driven by the electrical machine 106. On the other hand, the control of the voltage $U_{DC}$ can be tuned to be faster when the voltage $U_{DC}$ is outside the area between the above-mentioned desired limits and thus the voltage $U_{DC}$ can be kept sufficiently well in the area between the desired limits.

In a mobile working machine according to an exemplifying embodiment of the invention, the control signal path is asymmetric so that the control signal path has different signal processing properties when the electrical energy is below the reference value of the electrical energy than when the electrical energy is above the reference value of the electrical energy. In the exemplifying case illustrated in FIG. 1, the asymmetric control signal path can be implemented so that the proportional and integrative regulator 110 is configured to weight the deviation $U_{DC}-U_{DC\_}$Ref with a first gain coefficient G1 when the deviation is positive, and to weight the deviation with a second gain coefficient G2 when the deviation is negative. The first gain coefficient G1 can have a value different from that of the second gain coefficient G2 so as to implement the asymmetric control signal path. The asymmetric control signal path can be utilized, for example, in cases where the reference $U_{DC\_}$Ref is not in the middle of the allowed range of variation of the voltage $U_{DC}$.

In the exemplifying case shown in FIG. 1, it is assumed that the combustion engine 113 is operated according to a rotational speed reference Ref_Speed. The mobile working machine comprises a rotational speed and/or position indicator 115 and a controller 116 for regulating the operation of the combustion engine 113 on the basis of the rotational speed reference Ref_Speed and an output signal of the rotational speed and/or position indicator 115. In order to improve the accuracy of the control of stator voltages of the generator 114, the output signal of the rotational speed and/or position indicator 115 can be utilized also by the control system 108 in the control of the electronic power converter stage 104. The mechanical load represented by the actuator 111 is assumed to be driven according to a torque reference Ref_torq and the rotational speed of the actuator is determined in accordance with the load torque and the moment of inertia of the rotating parts of the actuator and the electrical machine 106. The mobile working machine comprises a regulator 117 for controlling the operation of the second electronic power converter stage 107 and the electrical machine 106 on the basis of the torque reference Ref_torq. In order to improve the accuracy of the torque control of the electrical machine 106, the actuator 111 can be connected to a rotational speed and/or position indicator 118 whose output signal is utilized in the torque control of the electrical machine 106. The actuator 111 could as well be driven according to a rotational speed reference. The rotational speed reference Ref_Speed of the combustion engine 113 can be arranged to be dependent on the power of the actuator according to a pre-determined rule, for example, so that the efficiently of the combustion engine 113 is optimized at each power of the actuator.

It is to be noted that in some situations, e.g. during braking, the electrical machine 106 may operate as a generator that charges the storage circuit 103, and the generator 114 may operate as a motor that rotates the combustion engine 113 which provides engine braking. The mobile working machine can be provided with a brake resistor 118 and/or with a battery element 102 and a controllable direct voltage converter stage 105 in order to eliminate or at least reduce the use of the combustion engine 113 for engine braking. Furthermore, the battery element enables recovery of the braking energy and the battery element can be used for smoothing the loading of the combustion engine 113.

In an electronic power converter according to an exemplifying embodiment of the invention, the control system 108 is configured to control the electronic power converter stage 104 to regulate the voltage $U_{DC}$ also on the basis of the electrical power P transferred from the storage circuit 103 to the electronic power converter stage 107. The power can be calculated as $P=U_{DC} \times I_{DC}$, where $I_{DC}$ is the current supplied to the electronic power converter stage 107 as illustrated in FIG. 1. A feed-forward path of the control of the voltage $U_{DC}$ can be based on the power P whereas the feed-back branch of the control is based on the deviation $U_{DC}-U_{DC\_}$Ref. The power $U_{DC} \times I_{CD}$ can also be filtered with a filter whose bandwidth depends on the deviation $U_{DC}-U_{DC\_}$Ref so that a greater absolute value of the deviation corresponds to a greater bandwidth than a smaller absolute value of the deviation. Therefore, the feed-forward path of the control of the voltage $U_{DC}$ can be arranged to be slow to transfer changes of the power P when the voltage $U_{DC}$ is between desired limits and faster when the voltage $U_{DC}$ is outside the area between the above-mentioned desired limits.

In a working machine according to an exemplifying embodiment of the invention, the controller 116 is configured to start the combustion engine 113 in response to a situation in which the electrical energy stored by the storage circuit 103 goes below a first pre-determined limit and to stop the combustion engine in response to a situation in which the electrical energy stored by the storage circuit exceeds a second pre-determined limit. The second pre-determined limit is preferably higher than the first pre-determined limit.

Figure 2:
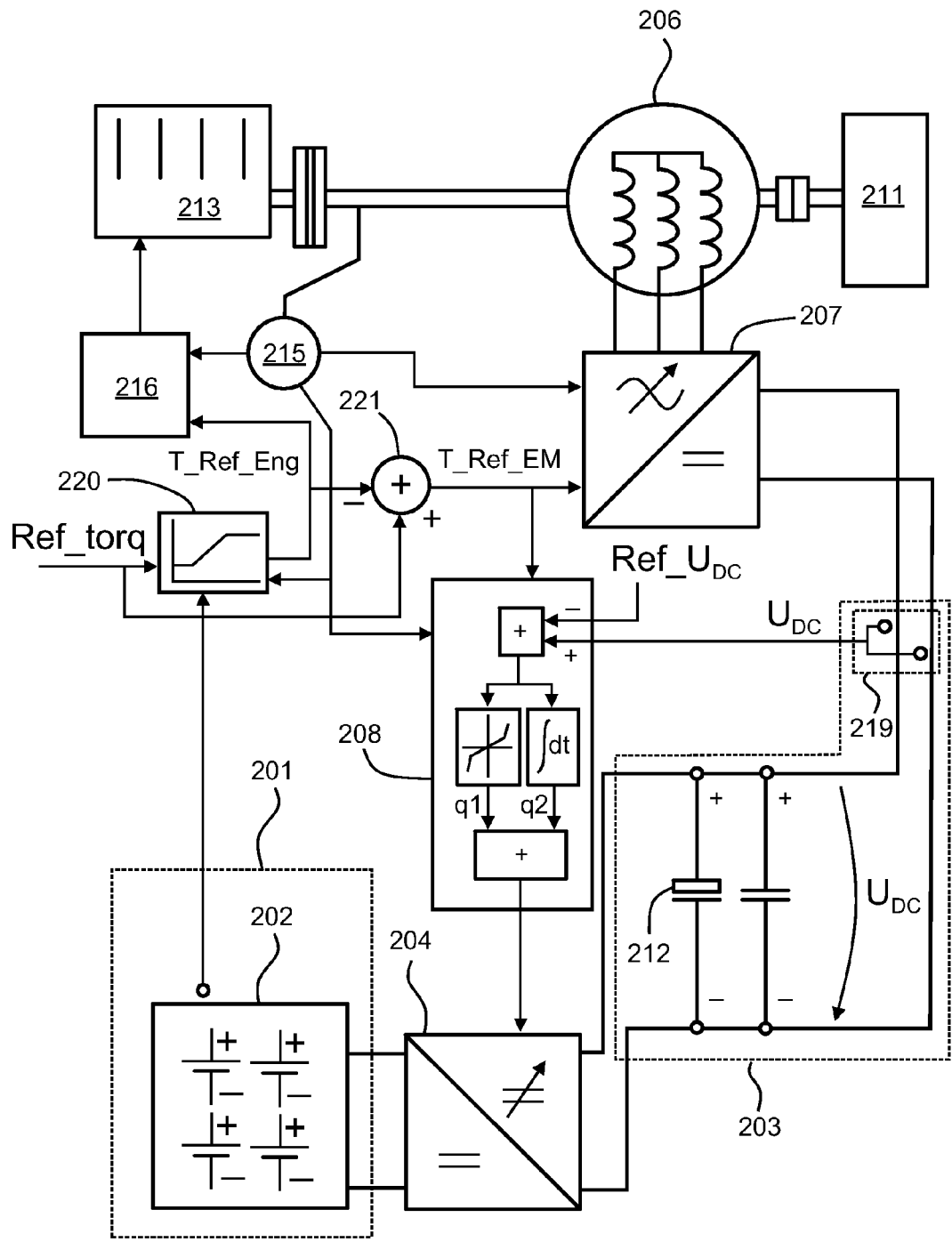
FIG. 2 shows a schematic illustration of a powering system of a mobile working machine according to an exemplifying embodiment of the invention.

FIG. 2 shows a schematic illustration of a powering system of a mobile working machine according to an exemplifying embodiment of the invention. The mobile working machine comprises a combustion engine 213 and an energy source 201 for supplying electrical energy. In this exemplifying case, the energy source 201 comprises a battery element 202. The mobile working machine comprises an electrical machine 206 that is mechanically connected to the combustion engine 213 and to an actuator 211 of the mobile working machine. The actuator can be, for example, a wheel, a chain track, or a hydraulic pump of the mobile working machine. The mobile working machine comprises a first electronic power converter stage 204 connected to the energy source 201, a second electronic power converter stage 207 connected to stator windings of the electrical machine 206, and a storage circuit 203 capable of storing electrical energy and connected to the first and second electronic power converter stages 204 and 207. In the exemplifying case illustrated in FIG. 2, the storage circuit 103 is a capacitive storage circuit that advantageously comprises an electric double layer capacitor "EDLC" 212. The electrical machine 206 operates sometimes as a generator which charges the storage circuit 203 and/or the battery element 202 and sometimes as a motor that receives electrical energy from the storage circuit 203 and/or the battery element 202 and assists the combustion engine 213 when high mechanical output power is needed. Thus, the battery element 202 and the storage circuit 203 are capable of smoothing the loading of the combustion engine 213. Furthermore, braking energy can be stored to the battery element 202 and/or to the storage circuit 203.

In the exemplifying case shown in FIG. 2, the actuator 211 is assumed to be driven according to a torque reference Ref_torq and the rotational speed of the actuator is determined in accordance with the load torque and the moment of inertia of the rotating parts. The torque reference Ref_torq is divided by functional blocks 220 and 221 into two components T_Ref_Eng and T_Ref_EM where T_Ref_Eng is the torque reference of the combustion engine 213 and T_Ref_EM is the torque reference of the electrical machine 206. The operation of the combustion engine 213 is regulated with a controller 216 on the basis of T_Ref_Eng and an output signal of a rotational speed and/or position indicator 215. The electronic power converter stage 207 is assumed to comprise a regulator for controlling the operation of the electronic power converter stage 207 on the basis of T_Ref_EM and the output signal of the speed and/or position indicator 215. In the exemplifying case illustrated in FIG. 2, the division of the torque reference Ref_torq is carried out in a way that T_Ref_EM=0 when the torque reference Ref_torq is between pre-determined minimum and maximum values $T_{min}$ and $T_{max}$, T_Ref_EM=Ref_torq−$T_{max}$ when Ref_torq>$T_{max}$, and T_Ref_EM=Ref_torq−$T_{min}$ when Ref_torq<$T_{min}$. Hence, when high torque is required, i.e. Ref_torq>$T_{max}$, T_Ref_EM is positive and thus the electrical machine 206 operates as a motor and assists the combustion engine 213, and when only low torque is required, i.e. Ref_torq<$T_{min}$. T_Ref_EM is negative and thus the electrical machine 206 operates as a generator and charges the storage circuit 203 and/or the battery element 202. The division of the torque reference Ref_torq into T_Ref_Eng and T_Ref_EM is preferably dependent on the rotational speed because the capability of the combustion engine 213 to produce high torque at low rotational speed is limited. Furthermore, the division of the torque reference Ref_torq is advantageously dependent on the state of charge of the battery element 202 and/or on the voltage $U_{DC}$ of the storage circuit 203.

The mobile working machine comprises a control system 208 for controlling the first electronic power converter stage 204 to respond to fluctuation of power taken by the second electronic power converter stage 207 from the storage circuit 203.

The control system 208 provides a control signal path from the storage circuit 203 to the first electronic power converter stage 204. In the exemplifying case illustrated in FIG. 2, the control signal path extends from a sensor 219 for measuring the voltage $U_{DC}$ to a control input of the first electronic power converter stage 204 via the control system 208. At least one signal processing property of the above-mentioned control signal path is arranged to be dependent on the amount of the electrical energy stored by the storage circuit 203. In the exemplifying case illustrated in FIG. 2, the control signal path has different signal processing properties when the electrical energy is within a pre-determined range than when the electrical energy is outside the pre-determined range. The control system 208 is configured to compute a non-linear function q1 on the basis of the deviation of the voltage $U_{DC}$ from its reference value $U_{DC}$_Ref so that the dynamic gain $d(q1)/d(U_{DC})$ is greater at a greater absolute value of the deviation than at a smaller absolute value of the deviation. The non-linear function can be, for example, such that the dynamic gain $d(q1)/d(U_{DC})$=DG1, when $U_{DC}$ is within a pre-determined range that includes the $U_{DC}$_Ref, and $d(q1)/d(U_{DC})$=DG2, when $U_{DC}$ is outside the pre-determined range, where DG2>DG1. The control system 208 can be further configured to compute a time integral q2 of the deviation $U_{DC}$−$U_{DC}$_Ref. The first electronic power converter stage 204 can be controlled on the basis of a weighted sum of the non-linear function q1 and the time integral q2. As the dynamic gain $d(q1)/d(U_{DC})$ is increased in a smooth or step-wise manner when the electrical energy stored by the storage circuit 203 gets farther from its reference value, i.e. $U_{DC}$ gets farther from its reference value $U_{DC}$_Ref, the control of the electrical energy stored by the storage circuit 203 gets faster when the energy gets farther from its reference value and slower when the energy gets nearer to the reference value. Therefore, the control of the voltage $U_{DC}$ can be arranged to be slow when the voltage $U_{DC}$ is between desired limits and thus the voltage $U_{DC}$ can be allowed to vary so as to at least partially respond to peak power needs of the actuator 211 driven by the electrical machine 206. On the other hand, the control of the voltage $U_{DC}$ can be tuned to be faster when the voltage $U_{DC}$ is outside the area between the above-mentioned desired limits and thus the voltage $U_{DC}$ can be kept sufficiently well in the area between the desired limits.

Figure 3:
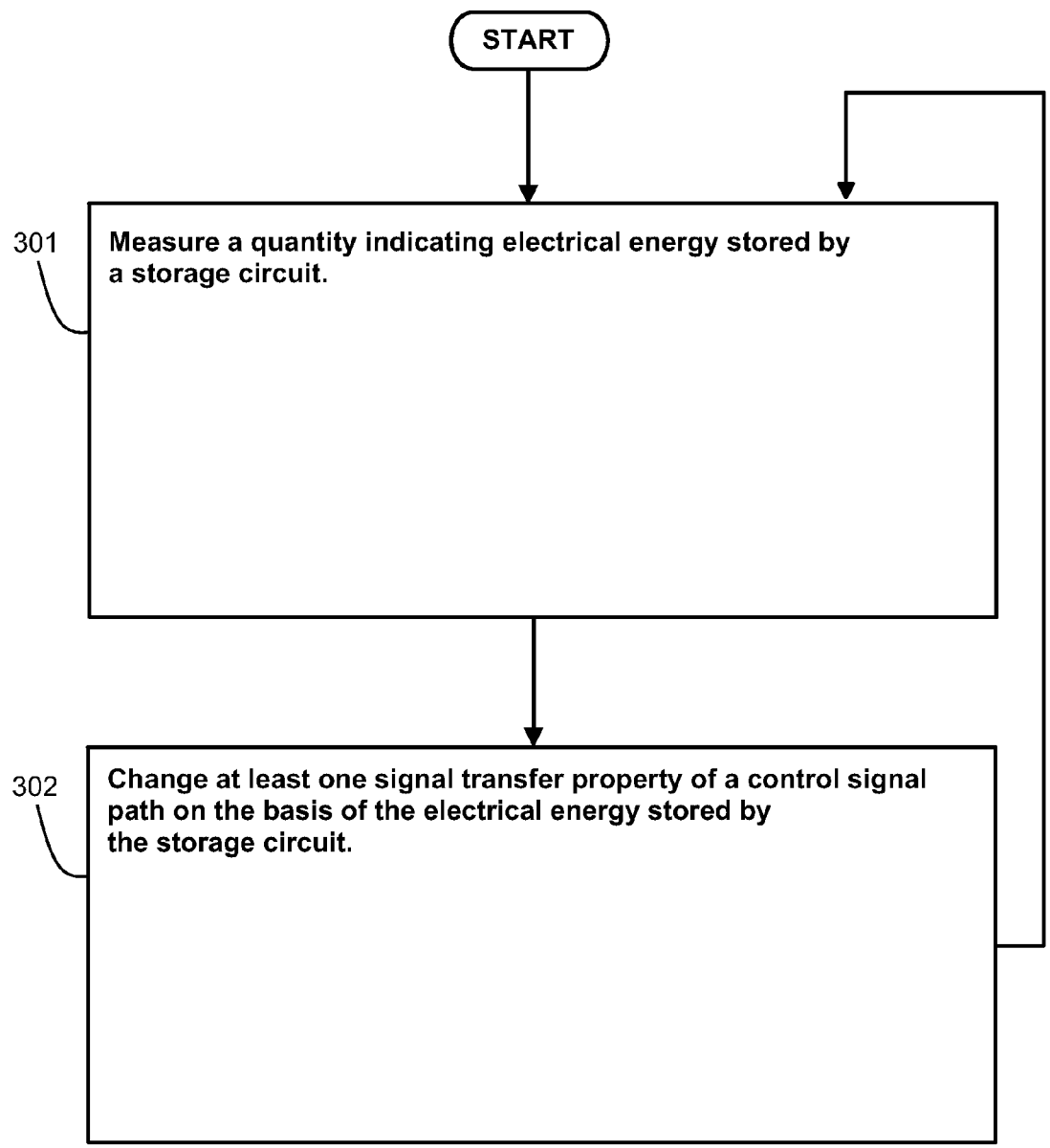
FIG. 3 shows a flow chart of a method according to an exemplifying embodiment of the invention for reducing the peak power taken out from an energy source of a mobile working machine.

FIG. 3 shows a flow chart of a method according to an exemplifying embodiment of the invention for reducing the peak power taken out from an energy source of a mobile working machine that comprises:
 a storage circuit for storing electrical energy,
 a first electronic power converter stage connected between the storage circuit and the energy source of the mobile working machine,
 an electrical machine for driving one or more actuators of the mobile working machine,
 a second electronic power converter stage connected between the storage circuit and the electrical machine, and
 a control system for controlling the first electronic power converter stage to respond to fluctuation of power taken by the second electronic power converter stage from the storage circuit, the control system providing a control signal path from the storage circuit to the first electronic power converter stage.

The method comprises the following actions:
 action 301: measuring an electrical quantity indicating the electrical energy E stored by the storage circuit, and
 action 302: changing at least one signal processing property of the control signal path on the basis of the electrical energy stored by the storage circuit so that a control of the electrical energy is slower to respond to changes of the power taken by the second electronic power converter stage when the electrical energy has a first value $E_1$ that is between second and third values $E_2$ and $E_3$, i.e. $E_2<E_1<E_3$, than when the electrical energy E has either one of the second and third values $E_2$ and $E_3$.

In a method according to an exemplifying embodiment of the invention, the storage circuit is a capacitive circuit and the above-mentioned electrical quantity is the voltage $U_{DC}$ of the capacitive circuit. The capacitive circuit comprises preferably an electric double layer capacitor "EDLC".

In a method according to another exemplifying embodiment of the invention, the storage circuit is an inductive circuit and the above-mentioned electrical quantity is the current of the inductive circuit.

In a method according to an exemplifying embodiment of the invention, the control signal path comprises a controllable filter and the method comprises increasing the bandwidth of the controllable filter in response to a situation in which the electrical energy gets farther from a reference value of the electrical energy.

In a method according to an exemplifying embodiment of the invention, the control signal path comprises a proportional and integrative "PI" regulator in series with the controllable filter.

In a method according to an exemplifying embodiment of the invention, the control signal path is asymmetric so that the control signal path is set to have different signal processing properties when the electrical energy is below a reference value of the electrical energy than when the electrical energy is above the reference value of the electrical energy.

In a method according to an exemplifying embodiment of the invention, the control signal path is set to have different signal processing properties when the electrical energy is within a pre-determined range than when the electrical energy is outside the pre-determined range.

A computer program according to an exemplifying embodiment of the invention for reducing the peak power taken out from an energy source of a mobile working machine comprises computer executable instructions for controlling a programmable processor to carry out a method according to any of the above-described exemplifying embodiments of the invention.

A computer program according to an exemplifying embodiment of the invention comprises software modules for the purpose of reducing the peak power taken out from an energy source of a mobile working machine that comprises:
- a storage circuit for storing electrical energy,
- a first electronic power converter stage connected between the storage circuit and the energy source of the mobile working machine,
- an electrical machine for driving one or more actuators of the mobile working machine,
- a second electronic power converter stage connected between the storage circuit and the electrical machine, and
- a control system for controlling the first electronic power converter stage to respond to fluctuation of power taken by the second electronic power converter stage from the storage circuit, the control system providing a control signal path from the storage circuit to the first electronic power converter stage.

The software modules comprise computer executable instructions for controlling a programmable processor to change at least one signal processing property of the control signal path on the basis of the electrical energy stored by the storage circuit so that the control of the electrical energy is slower to respond to changes of the power taken by the second electronic power converter stage when the electrical energy has a first value that is between second and third values than when the electrical energy has either one of the second and third values.

The software modules can be, for example, subroutines and functions generated with a suitable programming language.

A computer program product according to an exemplifying embodiment of the invention comprises a non-volatile computer readable medium, e.g. a compact disc "CD", encoded with the above-mentioned software modules.

A signal according to an exemplifying embodiment of the invention is encoded to carry information defining a computer program according to an embodiment of the invention.

Figure 4:
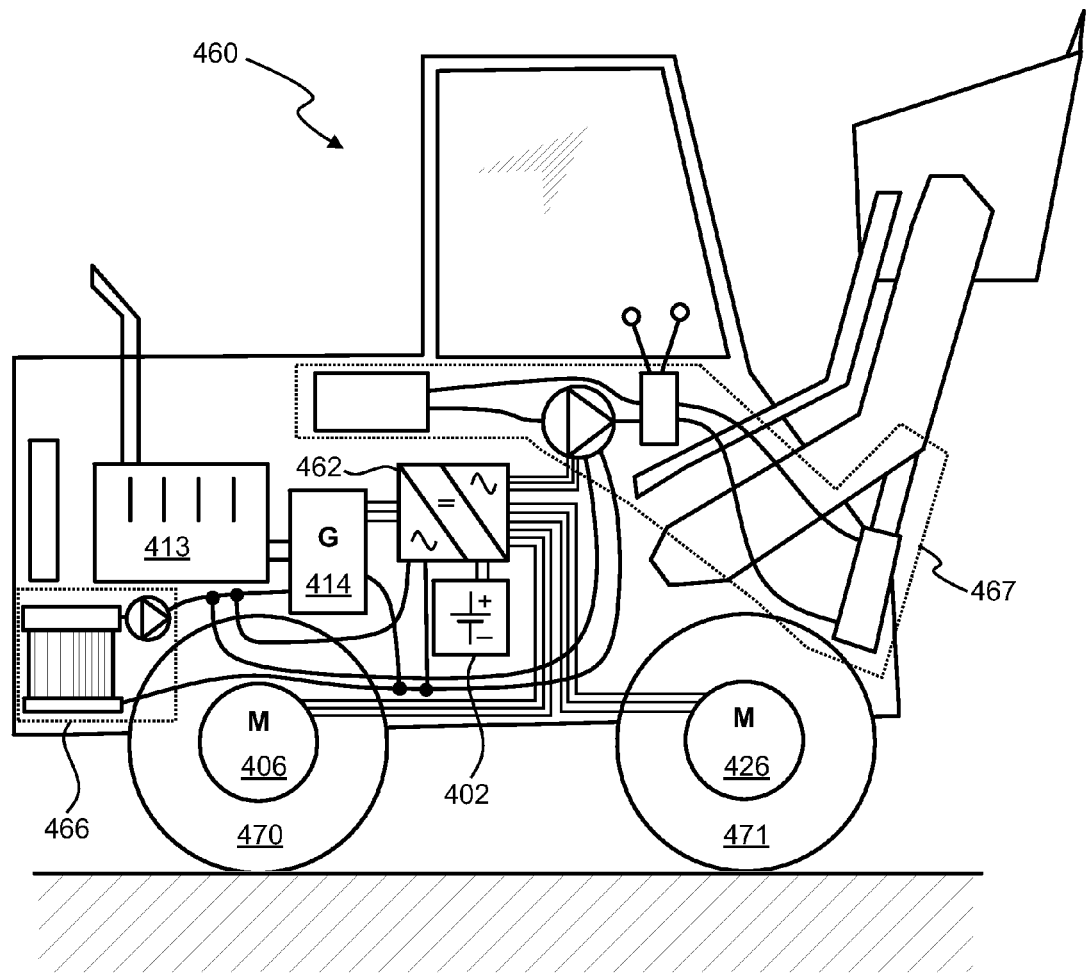
FIG. 4 shows a schematic illustration of a mobile working machine according to an exemplifying embodiment of the invention.

FIG. 4 shows a schematic illustration of a mobile working machine 460 according to an exemplifying embodiment of the invention. In this exemplifying case, the mobile working machine is a bucket charger but the mobile working machine could as well be a tractor, a road drag, a bulldozer, or any other mobile working machine. The mobile working machine 460 comprises an energy source that is constituted by a combustion engine 413 and a generator 414. The combustion engine can be, for example, a diesel engine, an Otto-cycle engine, or a turbine engine. The mobile working machine comprises power electronic equipment 462 that comprises:
- a storage circuit for storing electrical energy,
- a first electronic power converter stage connected between the storage circuit and the generator 414,
- a second electronic power converter stage connected to the storage circuit, and
- a control system for controlling the first electronic power converter stage to respond to fluctuation of power taken by the second electronic power converter stage from the storage circuit, the control system providing a control signal path from the storage circuit to the first electronic power converter stage.

At least one signal processing property of the control signal path is arranged to be dependent on the electrical energy stored by the storage circuit so that the control of the electrical energy is slower to respond to changes of the power taken by the second electronic power converter stage when the electrical energy has a first value that is between second and third values than when the electrical energy has either one of the second and third values.

The mobile working machine comprises electrical machines 406, 426 at the hubs of the wheels 470, 471. The above-mentioned second electronic power converter stage is connected between the above-mentioned storage circuit and the electrical machines 406, 426. The second electronic power converter stage is arranged to produce electrical voltages having amplitudes and frequencies suitable for the electrical machines 406, 422. The second electronic power converter stage may comprise a separate and independently controlled output stage for each of the electrical machines 406, 422. In this case, the electrical machines 406, 422 can be controlled independently of each other. It is, however, also possible that the electrical machines 406, 422 are parallel connected to a same output stage of the second electronic power converter stage and thus the electrical machines 406, 422 are controlled as a group.

In a mobile working machine according to an exemplifying embodiment of the invention, the storage circuit of the power electronic equipment 462 is a capacitive circuit that advantageous comprises an electric double layer capacitor "EDLC".

A mobile working machine according to an exemplifying embodiment of the invention comprises a liquid cooling system 466 arranged to cool the power electronic equipment 462 and the generator 414.

A mobile working machine according to an exemplifying embodiment of the invention comprises a liquid cooling system arranged to cool both a hydraulic system 467 of the mobile working machine, the power electronic equipment 462, and the generator 414.

A mobile working machine according to an exemplifying embodiment of the invention comprises a battery element 402 for smoothing the loading of the combustion engine 413. The battery can be connected to the storage circuit of the power electronic equipment 462 with the aid of a controllable direct voltage converter.

The specific examples provided in the description given above should not be construed as limiting the applicability and/or interpretation of the appended claims.

What is claimed is:

1. A mobile working machine comprising:
- an energy source for supplying electrical energy,
- a storage circuit for storing electrical energy,
- a first electronic power converter stage connected between the energy source and the storage circuit,
- an electrical machine for driving one or more actuators of the mobile working machine,
- a second electronic power converter stage connected between the storage circuit and the electrical machine, and
- a control system for controlling the first electronic power converter stage to respond to fluctuation of power taken by the second electronic power converter stage from the storage circuit, the control system providing a control signal path from the storage circuit to the first electronic power converter stage, wherein the control system is arranged to change at least one signal processing property of the control signal path on the basis of the electrical energy stored by the storage circuit so that a control of the electrical energy is slower to respond to changes of the power taken by the second electronic power converter stage when the electrical energy has a first value that is between second and third values than when the electrical energy has either one of the second and third values.

2. The mobile working machine according to claim 1, wherein the control signal path comprises a controllable filter and the control system is arranged to increase a bandwidth of the controllable filter in response to a situation in which the electrical energy gets farther from a reference value of the electrical energy.

3. The mobile working machine according to claim 2, wherein the control signal path comprises a proportional and integrative regulator in series with the controllable filter.

4. The mobile working machine according to claim 1, wherein the control signal path is asymmetric so that the control signal path has different signal processing properties when the electrical energy is below a reference value of the electrical energy than when the electrical energy is above the reference value of the electrical energy.

5. The mobile working machine according to claim 1, wherein the control signal path has different signal processing properties when the electrical energy is within a pre-determined range than when the electrical energy is outside the pre-determined range, the first value belonging to the pre-determined range and the second and third values being outside the pre-determined range.

6. The mobile working machine according to claim 1, wherein the storage circuit is a capacitive circuit and the electrical energy stored by storage circuit is directly proportional to the square of voltage of the capacitive circuit.

7. The mobile working machine according to claim 6, wherein the capacitive circuit comprises an electric double layer capacitor.

8. The mobile working machine according to claim 1, wherein the storage circuit is an inductive circuit and the electrical energy stored by storage circuit being directly proportional to the square of current of the inductive circuit.

9. The mobile working machine according to claim 1, wherein the energy source comprises a combustion engine and a generator connected between the combustion engine and the first electronic power converter stage.

10. The mobile working machine according to claim 9, wherein the working machine comprises a controller configured to start the combustion engine in response to a situation in which the electrical energy stored by the storage circuit goes below a first pre-determined limit.

11. The mobile working machine according to claim 9, wherein the working machine comprises a controller configured to stop the combustion engine in response to a situation in which the electrical energy stored by the storage circuit exceeds a second pre-determined limit.

12. A method for reducing a peak power taken out from an energy source of a mobile working machine, the mobile working machine comprising:
a storage circuit for storing electrical energy,
a first electronic power converter stage connected between the storage circuit and the energy source of the mobile working machine,
an electrical machine for driving one or more actuators of the mobile working machine,
a second electronic power converter stage connected between the storage circuit and the electrical machine, and
a control system for controlling the first electronic power converter stage to respond to fluctuation of power taken by the second electronic power converter stage from the storage circuit, the control system providing a control signal path from the storage circuit to the first electronic power converter stage,
wherein the method comprises changing at least one signal processing property of the control signal path on the basis of the electrical energy stored by the storage circuit so that a control of the electrical energy is slower to respond to changes of the power taken by the second electronic power converter stage when the electrical energy has a first value that is between second and third values than when the electrical energy has either one of the second and third values.

13. A non-transitory computer readable medium encoded with a computer program for reducing a peak power taken out from an energy source of a mobile working machine, the mobile working machine comprising:
a storage circuit for storing electrical energy,
a first electronic power converter stage connected between the storage circuit and the energy source of the mobile working machine,
an electrical machine for driving one or more actuators of the mobile working machine,
a second electronic power converter stage connected between the storage circuit and the electrical machine, and
a control system for controlling the first electronic power converter stage to respond to fluctuation of power taken by the second electronic power converter stage from the storage circuit, the control system providing a control signal path from the storage circuit to the first electronic power converter stage,
characterized in that the computer program comprises computer executable instructions for controlling a programmable processor to change at least one signal processing property of the control signal path on the basis of the electrical energy stored by the storage circuit so that a control of the electrical energy is slower to respond to changes of the power taken by the second electronic power converter stage when the electrical energy has a first value that is between second and third values than when the electrical energy has either one of the second and third values.

\* \* \* \* \*